Jan. 21, 1958

F. KOURY 2,820,931

SEMICONDUCTOR DEVICES AND METHODS

Filed April 27, 1953

INVENTOR
FREDERIC KOURY
BY Paul S. Martin
ATTORNEY

Patented Jan. 21, 1958

2,820,931

SEMICONDUCTOR DEVICES AND METHODS

Frederic Koury, Lexington, Mass., assignor to Sylvania Electric Products Inc., a corporation of Massachusetts Application April 27, 1953, Serial No. 351,113

7 Claims. (Cl. 317—236)

Figures 1, 2:
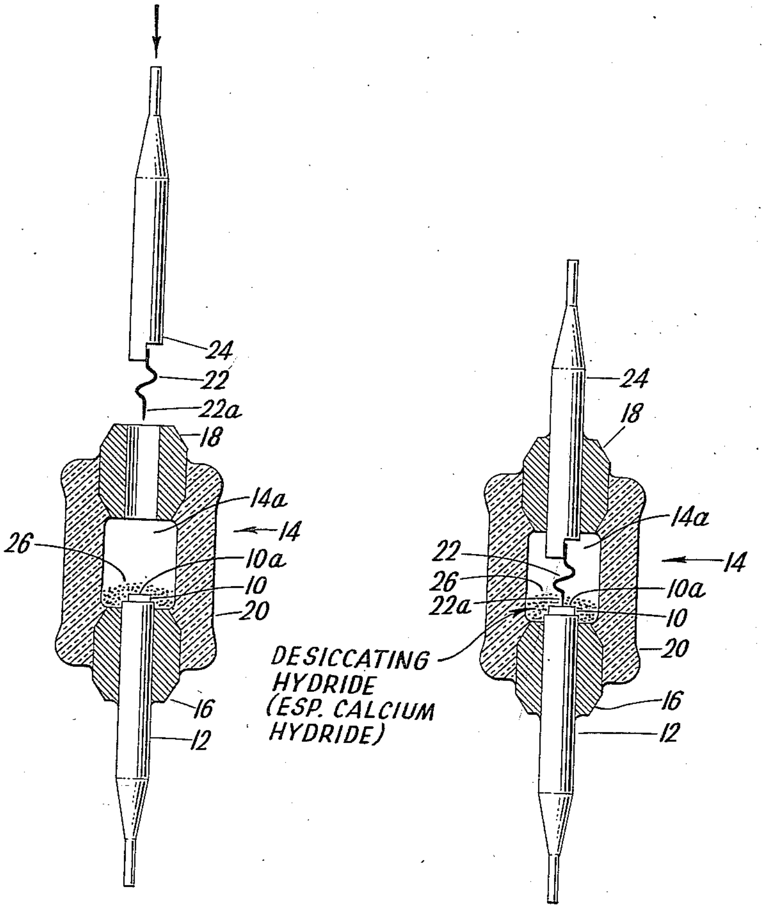

The present invention relates to semiconductor translators and transducers, such as diodes for rectification and other devices having rectifying contacts, and to the processing of highly stable semiconductor devices.

In a typical crystal diode, as one form of rectifying-contact semiconductor translator, a contoured resilient whisker engages a prepared contact surface of a semiconductor chip or wafer. This assembly is enclosed in an envelope that preferably is airtight to afford protection against atmospheric attack or contamination of the prepared semiconductor surface, especially in the region of the contact.

Although a variety of precautionary measures are followed during manufacture, there is still an objectionable amount of loss or "shrinkage," as represented for example in the production of drifting and unstable units, and failure during shelf life. It is difficult to reliably pin-point the reasons for less than anticipated yields in actual production. Losses may be due to a variety of causes, for example, the quality of the semiconductor body and its surface, the nature of the rectifying contact, and the presence of contaminating substances such as are used in soldering, etching, and/or pulsing, or to the limited volume of moisture trapped in the atmosphere within the envelope of the unit or adhering to the prepared semiconductor surface or on the envelope walls.

It is an object of the present invention to provide an improved method of processing semiconductor devices which provides for reducing such losses and for minimizing production of unstable units.

In accordance with one aspect of the present invention, a mass of a desiccating hydride which is highly insoluble and electrically insulating both before and after hydration, is placed within a semiconductor envelope which is then sealed. The desiccant is substantially chemically inert in relation to the contact and semiconductor elements, whether dehydrated or partially hydrated incidental to absorption of moisture.

As a feature of the invention, a desiccating hydride, notably calcium hydride, upon contact with moisture entering or trapped within a sealed semiconductor envelope, reacts to produce hydrogen and hydroxide. These materials are insoluble in water; and for this reason if the desiccant should reach the rectifying contact region, it would not provide an electrically or chemically active electrolyte in that critical region. In accordance with this feature, the hydrogen atmosphere developed within the envelope by reaction of moisture with the desiccating hydride develops pressure increase within the envelope with respect to external atmospheric pressure to inhibit entry of moisture-containing air in the event that the envelope has any faulty seal.

As a further feature of the invention, the ability of the calcium hydride to absorb all organic vapor and gas except for hydrogen and the noble gases, has been advantageously applied to promote "self-cleaning" of rectifying contact units, by the "getter" action of the desiccant.

The nature of the invention and further features, advantages and details will be best appreciated by reference to the following detailed disclosure, when taken in conjunction with the accompanying drawing, wherein:

Fig. 1 is an elevational and exploded view of a semiconductor diode partially processed in accordance with the teachings of the present invention; and, Fig. 2 is a sectional view illustrating a completed semiconductor diode embodying features of this invention.

In following standard practice as to the type of unit in Fig. 1, a properly prepared wafer of germanium 10, preferably polished and etched on the surface 10*a*, and copper plated on the opposite surface is soldered to a supporting pin 12. Mounting of the semiconductor chip 10 is accomplished conventionally with tin-lead solder and a suitable flux. Envelope 14 is illustrated as including axially aligned metal fittings or sleeves 16, 18 joined by glass-to-metal seals to a length of transparent glass tubing 20 serving as the envelope proper. As is well understood, the metallic sleeves 16, 18 are of an alloy appropriate for bonding to the type of glass of the tubing 20. Pin 12 bearing semiconductor wafer 10 is fixed and hermetically sealed within one of the sleeves.

In a separate operation, a further subassembly is prepared, including an appropriately contoured resilient wire whisker or contact element 22, as of tungsten, having a prepared point 22*a*. The whisker 22 is supported on an appropriate pin or lead 24 receivable within the fitting 18. Upon axial adjustment of the lead 24 supporting the whisker 22, the prepared point 22*a* is brought into proper pressure contact with the prepared surface 10*a* of the semiconductor wafer or crystal 10.

Prior to axial assembly of the pin 24 within the envelope or cartridge 14, a mobile quantity 26 of a finely divided desiccating hydride, notably powdered calcium hydride, is inserted into the envelope 14 via the bore of sleeve 18. Calcium hydride is electrically insulating and highly insoluble in water, both in its initial state and when partly hydrated. The presence of the calcium hydride as a finely powdered form assures capture of water vapor remaining in the unit, such as on the inside walls of the enclosure 14 and on the prepared surface 10*a* of the semiconductor, and avoids the possibility of moisture reaching the rectifying contact formed by whisker 22 and the semiconductor body 10.

Important advantages are realized in the event that the seals or joints between the envelope body 20 and the respective metal fittings 16, 18 and/or between the fittings and the pins 12, 24 should be defective. Admission of an initial quantity of moisture-laden air through such imperfect seal is minimized and retarded, since water absorption by the calcium hydride generates hydrogen which develops a back pressure within the enclosure 14*a*. Calcium hydride is capable of absorbing moisture in an amount equal to its molecular weight, and accordingly this will serve as a guide in determining the amount used.

After insertion of a suitable amount of the desiccating hydride, the pin 24 is inserted through the fitting 18 and axially adjusted to bring the point 22*a* into pressure contact with the prepared surface 10*a* of the germanium element 10. To facilitate passing of the whisker element 22 through the mass 26 of the desiccant as well as for promoting capture of moisture, it is desirable to vibrate the pin 12 and the cartridge 14 at high speeds during assembly, as disclosed in copending application Serial No. 347,320, filed concurrently herewith in the name of Donald I. Coggins and assigned to the assignee of the present invention.

The final sealing operation, disclosed herein as the joining of the lead or pin 24 by a solder joint to the sleeve 18, may be accomplished along with electrical pulsing and testing of the unit. The presence of the continuous solder seals for the unit between the respective fittings and leads is significant since there would be a tendency of the unit to continuously absorb moisture from the surrounding atmosphere as is true where relatively leaky mechanical joints are employed. In this respect the desiccant might adversely affect the semiconductor characteristics after a period of soaking up moisture continuously rather than to improve the yield, stability and life of the units produced. It is notable that the calcium hydride in no way restricts application of all the usual manufacturing techniques. Furthermore, calcium hydride acts as more than a desiccant, when it is considered that calcium hydride has the ability to absorb all organic vapors and gases except for hydrogen and the noble gases, where those gases like water vapor may contribute to the failures with shelf life that have been observed heretofore.

A typical processing technique in accordance with the present invention is substantially as follows: After initial assembly of the respective subassemblies, as illustrated in Fig. 1 and prior to the insertion of the desired quantity of the desiccating hydride, it is desirable to bake the germanium body for a prolonged period. The baking, prior to completion of the units, tends to drive off as much of the surface moisture as possible. Thereafter, the units are completed with concurrent electrical pulsing and testing, and vibrating if desired. After the sealing operation, it is advantageous to maintain the mechanically and electrically completed units at an elevated temperature, which improves the effectiveness of the calcium hydride, presumably by vaporizing any surface-trapped moisture on the semiconductor and elsewhere, and thus promoting moisture capture by the desiccating hydride. It should be appreciated that the value of the desiccating hydride is greatly enhanced by this baking operation, typically at temperature in the range of 70° C. to 150° C. for a number of hours. Higher temperatures would not reverse the reaction of the calcium hydride in removing water vapor, as might occur with desiccants that function by simple heat-reversible hydration; but higher temperatures might degrade the semiconductor or disturb the mechanical assembly.

Various features and aspects of the invention are subject to substitution and modification and the application of the invention to the so-called point-contact rectifier shown may be extended to silicon in lieu of germanium, and to the so-called junction form of rectifiers, and to transistors. Accordingly, the appended claims should be allowed such broad scope of interpretation as is consistent with the spirit and scope of the invention.

What is claimed is:

1. A semiconductor device comprising a sealed envelope, contact and semiconductor elements mounted in said envelope in proper mutual contact, and a hydride desiccant in said sealed envelope producing hydrogen within said sealed envelope upon moisture absorption.

2. A semiconductor device including contact and semiconductor elements providing a rectifying contact, a sealed envelope enclosing said elements, and a desiccating hydride in said envelope capable of reacting with moisture to produce hydrogen and an inert and insoluble compound.

3. In a semiconductor device including whisker and semiconductor elements meeting at a contact region and mounted in a sealed chamber, the improvement comprising a mass of an electrically insulating desiccating hydride within said sealed chamber which reacts with moisture and yields a hydrogen atmosphere within said sealed chamber.

4. In a semiconductor device including whisker and semiconductor elements meeting at a contact region and mounted in a sealed chamber, the improvement comprising calcium hydride within said sealed chamber which reacts with moisture and yields a hydrogen atmosphere within said sealed chamber.

5. The method of preparing stable semiconductor devices including the step of sealing the semiconductor element against atmospheric attack within an envelope containing a desiccating hydride capable of moisture capture and developing a hydrogen back pressure within said envelope to inhibit entry of atmosphere through inadvertently leaky seals.

6. The method of preparing semiconductor devices including the steps of enclosing and sealing within an envelope a quantity of calcium hydride together with a semiconductor unit embodying a rectifying junction, and promptly thereafter baking the sealed device for a prolonged period at 70–150° centigrade.

7. The method of preparing semiconductor devices which comprises assembling calcium hydride within an envelope containing the semiconductor element and water vapor, sealing said envelope, and applying heat to said hydride to cause reaction of the hydride with the water vapor to form calcium hydroxide and hydrogen gas.

References Cited in the file of this patent

UNITED STATES PATENTS

| | | |
|---|---|---|
| 756,676 | Midgley | Apr. 5, 1904 |
| 2,067,134 | Zabel | Jan. 5, 1937 |
| 2,460,109 | Southworth | Jan. 25, 1949 |
| 2,632,042 | Fitchett | Mar. 17, 1953 |